(No Model.)
B. C. CROSS.
WATER CLOSET.
No. 270,934. Patented Jan. 23, 1883.
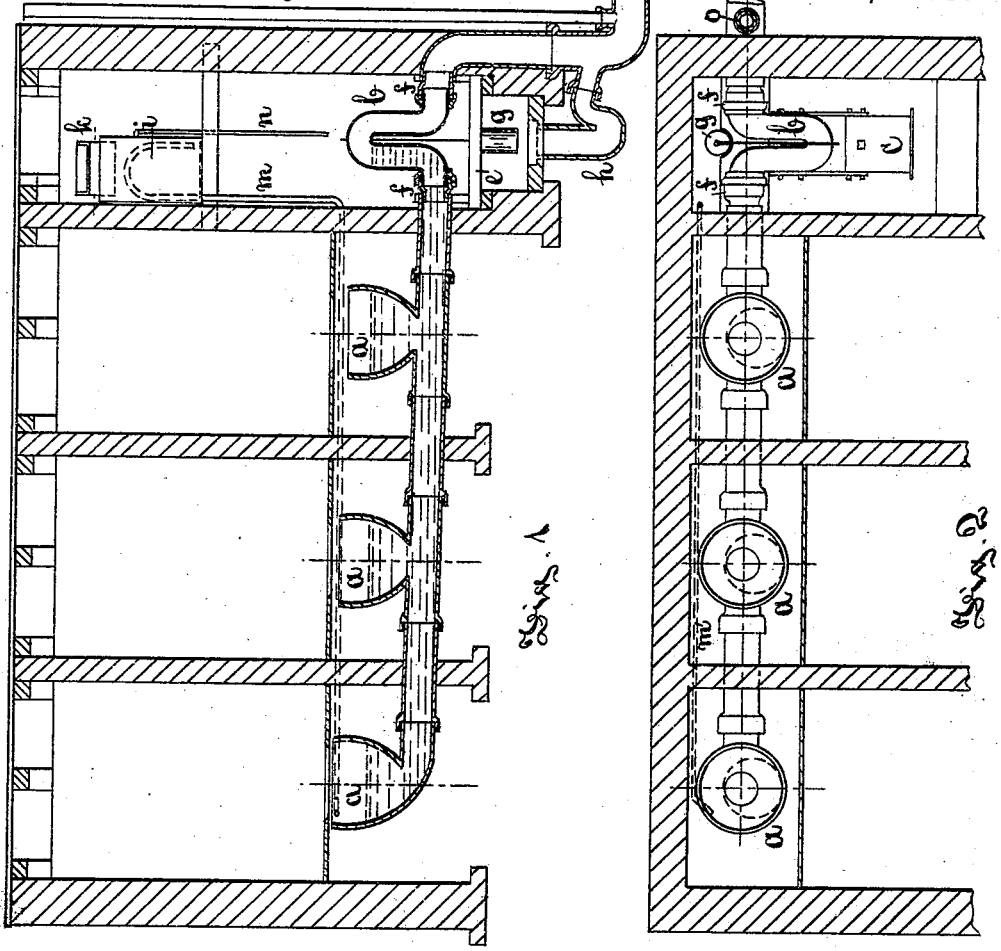
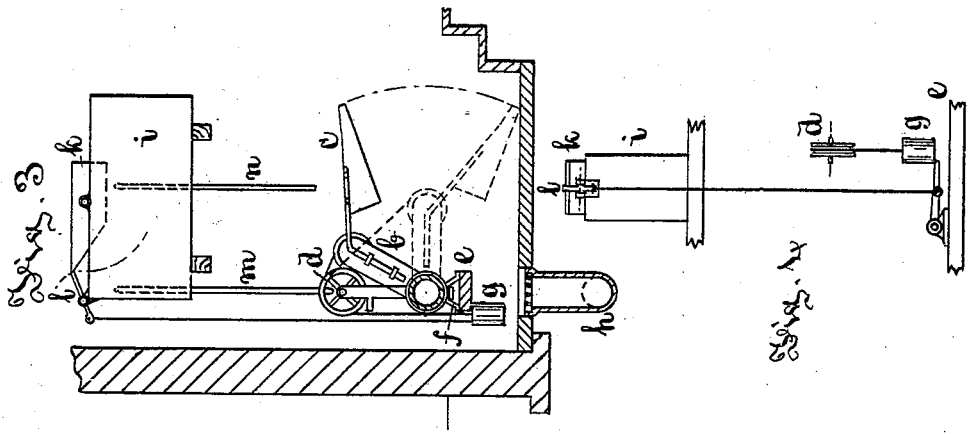
Witnesses:
J. C. Wildman
W. T. Hutchinson
Benjamin Crocker Cross. Inventor.
By John J. Halsted & Son
Attorneys

UNITED STATES PATENT OFFICE.

BENJAMIN C. CROSS, OF DEWSBURY, COUNTY OF YORK, ENGLAND.

WATER-CLOSET.

SPECIFICATION forming part of Letters Patent No. 270,934, dated January 23, 1883.

Application filed May 4, 1882. (No model.) Patented in England June 11, 1878, No. 2,324.

*To all whom it may concern:*

Be it known that I, BENJAMIN CROCKER CROSS, of Dewsbury, in the county of York, England, have invented certain new and useful Improvements in Self-Acting Trough Water-Closets; and I do hereby declare the following to be a full, clear, and exact description of the invention, reference being had to the accompanying drawings, and to the letters or figures of reference marked thereon, which form a part of this specification.

My invention relates to improvements in self-acting trough water-closets in which one or more troughs or basins are used, which are emptied, cleansed, and flushed with water at intervals, as required; and the objects of my improvements are, first, to make the water-closets self-acting, so that no manual labor is required, and they rarely need to be visited and examined; second, to use only a limited quantity of water, which quantity cannot be altered by the users, so that waste is rendered impossible; third, to thoroughly flush the troughs with water every time the apparatus works, so that they are always kept clean and healthy.

The accompanying drawings are in illustration of my invention, in which Figure 1 is a vertical section of an entire apparatus having three troughs or basins. Fig. 2 is a plan; Fig. 3, a transverse section of the same, and Fig. 4 a detail view.

Similar letters of reference refer to similar parts through the several views.

$a\ a\ a$ are the troughs or basins, the lower ends of which open into a pipe common to all.

$b$ is a siphon-pipe, the ends of which fit and turn in sockets at $f\ f$ in the said trough-pipe and in a descending drain-pipe, respectively, the joints being preferably made sufficiently water-tight by short lengths of india-rubber pipe, as shown.

$c$ is a tank attached to and turning with the siphon-pipe $b$. A cord or wire is attached to the siphon-pipe $b$, and, passing over a wheel, $d$, is attached to a balance-weight, $g$, by which the siphon-pipe $b$ is kept in a position nearly vertical.

$e$ is a wooden or other foundation for the apparatus, and $h$ is a trapped drain-pipe into the main discharge-pipe.

$i$ is a water-cistern at a higher level, and $k$ is a tumbler-cistern turning upon a center, but prevented from turning and discharging its contents into the cistern $i$ by a catch, $l$, as shown in Figs. 3 and 4, to which is connected a chain or wire attached at its lower end to a lever turning upon a center upon the foundation $e$, as shown in Fig. 4. This lever is arranged so that the weight $g$ in its descent operates it and releases the catch $l$. A siphon-pipe, $m$, is arranged so that its upper end forms a siphon in the cistern $i$, while its lower end passes into and flushes with water one or more of the troughs $a$.

The action of the apparatus is as follows: A small regulated stream of water from a main or other supply is allowed constantly to run into the tumbler-cistern $k$, which, when filled, is prevented by the catch $l$ from discharging its contents into the cistern $i$. When the tumbler-cistern $k$ is thus full of water the water runs over into the main cistern $i$ and fills it to the level of the overflow-pipe $n$, through which the water then passes and fills the balance-tank $c$ through a hole in its top. As soon as a certain quantity of water has passed into the tank $c$ its weight exceeds that of the weight $g$ and the siphon-pipe $b$ suddenly falls to a horizontal position, as shown in Fig. 2 and in dotted lines in Fig. 3, and the whole contents of the troughs $a\ a\ a$ at once rush into the drain. By the time these troughs are empty the water has flowed from the cistern $c$ through a small hole at its outer end, and the siphon-pipe $b$ being thus lightened the weight $g$ raises it again to its vertical position. As it descends the weight $g$ operates upon the lever, which releases the catch $l$, and the tumbler-cistern $k$ falls and discharges its contents into the cistern $i$, raising the level of the water in the latter above the bend of the siphon-pipe $m$, through which the water flows, discharging the contents of the cistern $i$ into the troughs $a\ a\ a$, which are then again ready for use. The cistern $i$ holds the quantity of water required for the supply of the troughs at one time. When the tumbler-cistern $k$ has emptied itself it returns to its original position, where it is retained by the catch $l$. The frequency with which the series of operations described takes place is regulated by the supply of water to the tumbler-cistern k, which can be regulated as desired. o is a ventilating-pipe to the drain.

I claim as my invention and desire to secure by Letters Patent—

1. The combination, in trough water-closets, of the troughs a a a, with the movable siphon-pipe b, balance-tank c, means for intermittently supplying water to the tank, and supply-pipe m, all substantially as set forth, and shown in the drawings.

2. In trough water-closets, the combination of the troughs a a a, movable siphon b, and balance-tank c, with the water-supply siphon-pipe m, cistern i, overflow-pipe n, and tumbler-cistern k, supported by the catch l, and lever operated by the weight g, all substantially as set forth, and shown in the drawings.

In testimony whereof I have signed my name to this specification in the presence of two subscribing witnesses.

BENJAMIN CROCKER CROSS.

Witnesses:
EDMUND EDWARDS,
ARTHUR E. EDWARDS.